US009065841B2

(12) United States Patent
Koga

(10) Patent No.: US 9,065,841 B2
(45) Date of Patent: Jun. 23, 2015

(54) PROPAGATION TIME MEASUREMENT DEVICE AND ELECTRONIC KEY SYSTEM

(71) Applicant: KABUSHIKI KAISHA TOKAI RIKA DENKI SEISAKUSHO, Aichi (JP)

(72) Inventor: Kenichi Koga, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 5 days.

(21) Appl. No.: 14/178,742

(22) Filed: Feb. 12, 2014

(65) Prior Publication Data

US 2014/0235181 A1    Aug. 21, 2014

(30) Foreign Application Priority Data

Feb. 19, 2013  (JP) .................. 2013-030094

(51) Int. Cl.
H04W 12/10 (2009.01)
H04L 29/06 (2006.01)

(52) U.S. Cl.
CPC .............. *H04L 63/12* (2013.01); *H04W 12/10* (2013.01); *H04L 63/126* (2013.01)

(58) Field of Classification Search
CPC ............................ H04W 64/00; H04W 12/10
USPC ............ 455/67.16, 67.11, 115.1, 226.1, 427, 455/12.1; 342/387, 357.69
See application file for complete search history.

(56) References Cited

U.S. PATENT DOCUMENTS

| 5,039,220 | A | * | 8/1991 | Arditty et al. ................. 356/464 |
| 5,679,930 | A | * | 10/1997 | Katsurahira ............... 178/19.06 |
| 5,722,080 | A | * | 2/1998 | Kondo .......................... 455/502 |
| 6,121,923 | A | * | 9/2000 | King ........................ 342/357.42 |
| 6,233,459 | B1 | * | 5/2001 | Sullivan et al. ............ 455/456.2 |
| 6,300,899 | B1 | * | 10/2001 | King ........................ 342/357.69 |
| 6,405,047 | B1 | * | 6/2002 | Moon ........................ 455/456.1 |
| 6,647,026 | B1 | * | 11/2003 | Tanaka ......................... 370/509 |
| 6,650,686 | B1 | * | 11/2003 | Kondo .......................... 375/130 |
| 6,903,684 | B1 | * | 6/2005 | Simic et al. ............. 342/357.29 |
| 6,973,316 | B1 | * | 12/2005 | Hayakawa ................ 455/456.1 |
| 7,671,790 | B2 | * | 3/2010 | Kurata ..................... 342/357.69 |
| RE42,543 | E | * | 7/2011 | Vayanos et al. ............ 455/456.1 |
| 8,244,304 | B2 | * | 8/2012 | Bommas et al. .............. 455/561 |
| 8,818,398 | B1 | * | 8/2014 | Nelson et al. .............. 455/456.1 |

(Continued)

FOREIGN PATENT DOCUMENTS

| JP | 09-170364 | 6/1997 |
| JP | 2003-013644 | 1/2003 |

(Continued)

*Primary Examiner* — Minh D Dao
(74) *Attorney, Agent, or Firm* — Greenblum & Bernstein, P.L.C.

(57) ABSTRACT

A propagation time measurement device measures a propagation time of a transmission signal from when the transmission signal is transmitted, through wireless communication, from a base station to a terminal to when the transmission signal is returned to the base station from the terminal. Continuous waves having different frequencies are combined to generate the transmission signal. The propagation time measurement device includes a correlation computation unit that generates correlation values by performing a correlation computation on each of the continuous waves and a reception signal that is returned from the terminal and received by the base station. A propagation time measurement unit measures the measurement time from a phase of the correlation value generated for each continuous wave during the correlation computation.

8 Claims, 3 Drawing Sheets

(56) References Cited

U.S. PATENT DOCUMENTS

| | | | |
|---|---|---|---|
| 8,849,306 B1* | 9/2014 | McMullen et al. | 455/456.1 |
| 2003/0091009 A1* | 5/2003 | Halivaara | 370/335 |
| 2004/0198387 A1* | 10/2004 | Tsuji et al. | 455/456.1 |
| 2004/0219930 A1* | 11/2004 | Lin | 455/456.1 |
| 2007/0075899 A1* | 4/2007 | Inaba | 342/387 |
| 2012/0256677 A1* | 10/2012 | Rehm | 327/392 |
| 2014/0011458 A1 | 1/2014 | Koga et al. | |

FOREIGN PATENT DOCUMENTS

| | | |
|---|---|---|
| JP | 2006-512515 | 4/2006 |
| JP | 2008-515315 | 5/2008 |
| WO | 2004/010388 | 1/2004 |
| WO | 2006/035361 | 4/2006 |

\* cited by examiner $F(t)\cos(\omega t)$ $F(t-2\Delta t)\cos(\omega t)$

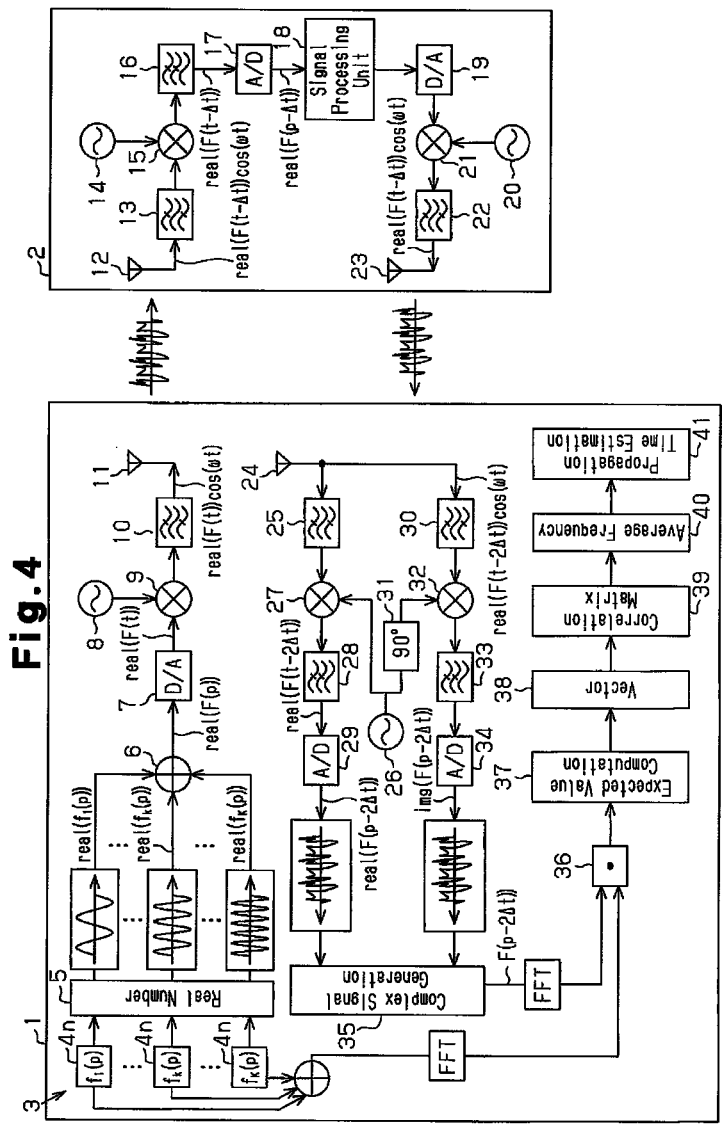

PROPAGATION TIME MEASUREMENT DEVICE AND ELECTRONIC KEY SYSTEM

CROSS-REFERENCE TO RELATED APPLICATIONS

This application is based upon and claims the benefit of priority from prior Japanese Patent Application No. 2013-030094, filed on Feb. 19, 2013, the entire contents of which are incorporated herein by reference.

BACKGROUND OF THE INVENTION

The present invention relates to a propagation time measurement device that transfers a signal between a base station and a terminal to measure the propagation time of the signal.

A known propagation time measurement device estimates the time of a signal propagated between a base station and a terminal (for example, refer to Japanese Laid-Open Patent Publication Nos. 9-170364, 2003-13644, 2006-512515, and 2008-515315). More specifically, the base station transmits a signal to the terminal. The terminal that receives the signal returns the signal to the base station. The propagation time measurement device uses the signal received by the base station to estimate the propagation time of the signal. The application of such a propagation time measurement device to an electronic key system has been discussed. An electronic key system verifies an electronic key through wireless communication performed between the electronic key and a vehicle. Unauthorized communication may be established between the vehicle and an electronic key by using a relay. The application of the propagation time measurement device would prevent such unauthorized verification of the electronic key.

SUMMARY OF THE INVENTION

In such a propagation time measurement device, it is desirable that the circuit configuration be facilitated. In particular, when the propagation time measurement device needs an expensive circuit, this would increase the cost of the propagation time measurement device. Thus, a simplified circuit configuration would allow the propagation time measurement device to be more versatile.

One aspect of the present invention is a propagation time measurement device that measures a propagation time of a transmission signal from when the transmission signal is transmitted, through wireless communication, from a base station to a terminal to when the transmission signal is returned to the base station from the terminal. Continuous waves having different frequencies are combined to generate the transmission signal. The propagation time measurement device includes a correlation computation unit that generates a plurality of correlation values by performing a correlation computation on each of the continuous waves and a reception signal that is returned from the terminal and received by the base station. A propagation time measurement unit measures the propagation time from a phase of the correlation value generated for each continuous wave in the correlation computation.

A further aspect of the present invention is an electronic key system in which a transmission signal is transmitted, through wireless communication, from a vehicle to an electronic key and returned to the vehicle from the electronic key. Continuous waves having different frequencies are combined to generate the transmission signal. The electronic key system includes a propagation time measurement device that measures a propagation time of the transmission signal from when the vehicle transmits the transmission signal to the electronic key to when the transmission signal returns to the vehicle from the electronic key. The propagation time measurement device includes a correlation computation unit that generates a plurality of correlation values by performing a correlation computation on each of the continuous waves and a reception signal that is returned from the electronic key and received by the vehicle. A propagation time measurement unit measures the propagation time from a phase of the correlation value generated for each continuous wave in the correlation computation.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 4 is a diagram showing a comparative propagation time measurement device.

DETAILED DESCRIPTION OF THE INVENTION

Figure 1:
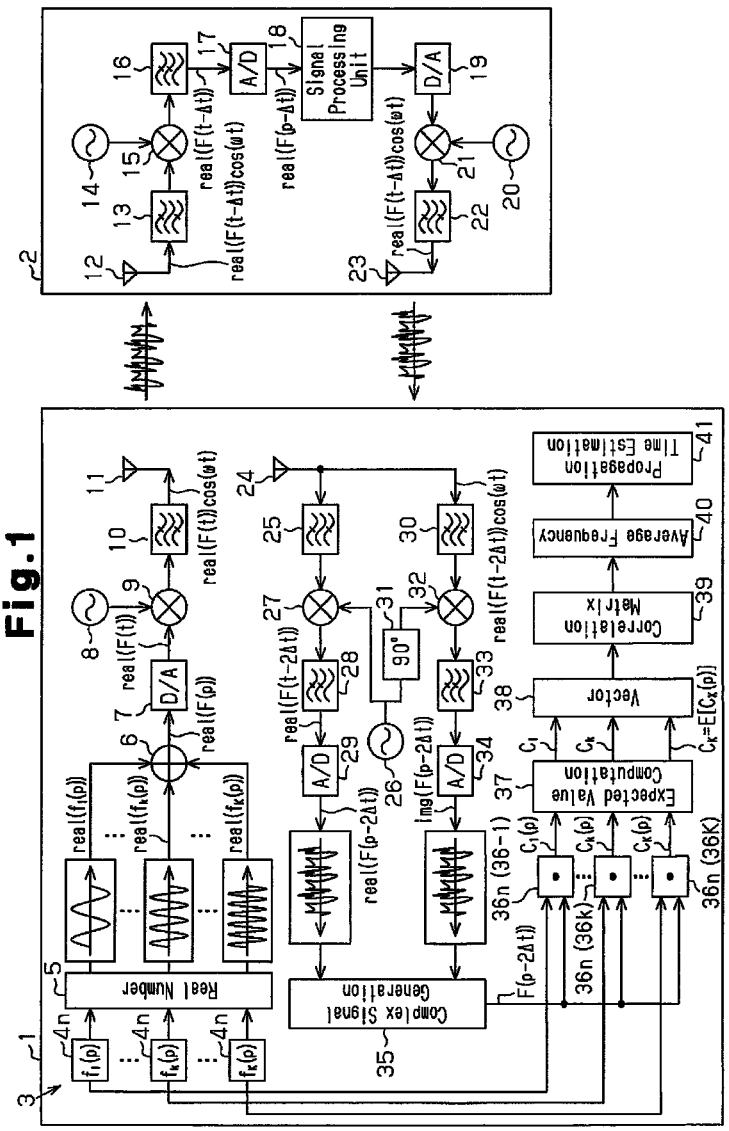
FIG. 1 is a diagram showing one embodiment of a propagation time measurement device.

Referring to FIG. 1, a base station 1 includes a propagation time measurement device 3 that measures a propagation time of a transmission signal from when the transmission signal is transmitted, through wireless communication, from the base station 1 to a terminal to when the transmission signal is returned to the base station 1 from the terminal 2. The transmission signal is formed by combining a plurality of continuous waves having different frequencies. The propagation time measurement device 3 includes a correlation computation unit 36n and a propagation time estimation unit 41. The correlation computation unit 36n performs a correlation computation on a reception signal, which is returned from the terminal and received by the base station, and each of the continuous waves to generate a plurality of correlation values. The propagation time estimation unit 41 measures the propagation time from the phase of the correlation value generated for each continuous wave in the correlation computation. The propagation time measurement device 3 is used in an electronic key system that verifies the ID of an electronic key through wireless communication. Even if ID verification is accomplished between the base station 1 and the terminal, as long as the propagation time $\Delta t$ is longer than or equal to a threshold, the propagation time measurement device 3 determines that there is a high probability of unauthorized communication and invalidates the ID verification.

The propagation time measurement device 3 will now be described with reference to FIGS. 1 to 4.

The base station 1 includes a plurality of oscillators $4n$, where n is 1 to K. The oscillators $4n$ respectively generate complex signals $f_k(p)$, which are non-modulated continuous waves (CW) having different frequencies. The complex signal $f_k(p)$ of each frequency includes a real part and an imaginary part, which are signal components. Here, "k" is a number representing the ordinal number of the frequency, "K" represents the total number of the used frequencies, and "p" represents the discrete time.

Each oscillator $4n$ is connected to a real number acquisition unit 5 that acquires the real part from the complex signal $f_k(p)$. The real number acquisition unit 5 acquires the real part from the complex signal $f_k(p)$ and generates a signal real($f_k(p)$), where real(•) represents a function that acquires the real part from the complex signal $f_k(p)$. An adder 6 is provided with the signal real($f_k(p)$). The adder 6 adds a plurality of the signals real($f_k(p)$) and generates a combined signal real(F(p)). A D/A converter 7, a local oscillator 8, a mixer 9, a bandpass filter 10, and a transmission antenna 11 are located at the downstream side of the adder 6. The D/A converter 7 D/A-converts the combined signal real(F(p)) provided from the adder 6. The mixer 9 multiplies the D/A-converted combined signal real (F(p)) by an oscillation signal from the local oscillator 8. The bandpass filter 10 filters the multiplied signal from the mixer 9. The transmission antenna 11 transmits the filtered combined signal as a transmission signal real(F(t))cos($\omega$t), where "F(p)" and "F(t)" represent combined complex signals, and "t" represents a continuous time.

The terminal 2 includes a reception antenna 12, a bandpass filter 13, a local oscillator 14, a mixer 15, a lowpass filter 16, and an A/D converter 17. The reception antenna 12 receives a reception signal real(F(t–$\Delta$t))cos($\omega$t) that is delayed by a propagation time $\Delta$t from the transmission signal real(F(t)) cos($\omega$t), which is transmitted from the base station 1. The bandpass filter 13 filters the reception signal real(F(t–$\Delta$t))cos ($\omega$t). The mixer 15 multiplies the filtered reception signal by an oscillation signal from the local oscillator 14. The lowpass filter 16 filters the multiplied reception signal from the mixer 15. The A/D converter 17 A/D-converts the filtered reception signal real(F(t–$\Delta$t)) from the lowpass filter 16.

The terminal 2 includes a signal processing unit 18 that reads the real(F(p–$\Delta$t)) from the A/D converter 17 and has the terminal 2 execute an operation based on the reception signal real(F(p–$\Delta$t)). When the signal processing unit 18 recognizes that the reception signal real(F(t–$\Delta$t))cos($\omega$t) was transmitted from the base station 1, the signal processing unit 18 controls the terminal 2 to return the reception signal real(F(t–$\Delta$t))cos ($\omega$t) to the base station 1.

Further, the terminal 2 includes a D/A converter 19, a local oscillator 20, a mixer 21, a bandpass filter 22, and a transmission antenna 23. The D/A converter 19 D/A-converts the signal provided from the signal processing unit 18 when returning radio waves. The mixer 21 multiplies the D/A converted signal by an oscillation signal from the local oscillator 20. The bandpass filter 22 filters the multiplied signal from the mixer 21. The transmission antenna 23 transmits the filtered signal from the bandpass filter as a transmission signal real(F(t–$\Delta$t))cos($\omega$t).

The base station 1 includes a reception antenna 24 that receives a signal delayed by the propagation time $\Delta$t from the transmission signal real(F(t–$\Delta$t))cos($\omega$t), which is transmitted from the terminal 2. The downstream side of the reception antenna 24 is branched into two lines. One line extending from the reception antenna 24 includes a bandpass filter 25, a local oscillator 26, a mixer 27, a lowpass filter 28, and an A/D converter 29. The bandpass filter 25 filters a reception signal real(F(t–2$\Delta$t))cos($\omega$t). The mixer 27 multiplies the filtered signal from the bandpass filter 25 by an oscillation signal from the local oscillator 26. Among the multiplied signals from the mixer 27, the lowpass filter 28 allows for the passage of only signals having a low frequency. The A/D converter 29 A/D-converts the filtered reception signal real(F(t–2$\Delta$t)) from the lowpass filter 28 and generates the reception signal real (F(p–2$\Delta$t)). The bandpass filter 25, the local oscillator 26, the mixer 27, the lowpass filter 28, and the A/D converter 29 may form an example of a first demodulation unit.

The other line extending from the downstream side of the reception antenna 24 includes a bandpass filter 30, a phase shifter 31, a mixer 32, a lowpass filter 33, and an A/D converter 34. The bandpass filter 30 filters the reception signal real(F(t–2$\Delta$t))cos($\omega$t). The mixer 32 multiples a signal, which is obtained by retarding the phase of an oscillation signal from the local oscillator 26 by 90° with the phase shifter 31, by the filtered signal from the bandpass filter 30. Among the multiplied signals from the mixer 32, the lowpass filter 33 allows for the passage of only signals having a low frequency. The A/D converter 34 A/D-converts the filtered signal from the lowpass filter 33 and generates a reception signal img(F(p–2$\Delta$t)), where img(•) represents a function that acquires the imaginary part from the complex signal. The local oscillator 26, the bandpass filter 30, the phase shifter 31, the mixer 32, the lowpass filter 33, and the A/D converter 34 may form an example of a second demodulation unit.

The base station 1 includes a complex signal generation unit 35 capable of generating a complex signal from the real part and the imaginary part. The complex signal generation unit 35 obtains a complex signal (F(p–2$\Delta$t)) based on the reception signal real(F(t–2$\Delta$t)) from the A/D converter 29 and the reception signal img(F(p–2$\Delta$t)) from the A/D converter 34.

Further, the base station 1 includes a correlation computation units $36n$, where n is 1 to K. The correlation computation units $36n$ calculate the correlation between each complex signal $f_k(p)$ and the complex signal (F(p–2$\Delta$t)). The correlation computation unit 36-1 computes the correlation of a complex signal $f_1(p)$ and the complex signal (F(p–2$\Delta$t)) to generate a correlation value $c_1(p)$ as the computation result. The correlation computation unit $36k$ computes the correlation of a complex signal $f_k(p)$ and the complex signal (F(p–2$\Delta$t)) to generate a correlation value $c_k(p)$ as the computation result. The correlation computation unit 36K computes the correlation of a complex signal $f_K(p)$ and the complex signal (F(p–2$\Delta$t)) to generate a correlation value $c_K(p)$ as the computation result.

The base station 1 also includes an expected value computation unit 37, a vector unit 38, a correlation matrix unit 39, an average frequency computation unit 40, and a propagation time estimation unit 41.

The expected value computation unit 37 computes expected values for the correlation values $c_1(p)$ to $c_K(p)$ from the correlation computation units $36n$ to generate a plurality of complex correlation values $c_k$. The expected value computation unit 37 obtains a complex correlation value $c_k$ (E[$c_k$(p)]) for each of the correlation values $c_1(p)$ to $c_K(p)$, where "E[•]" represents a computed expected value.

The vector unit 38 vectorizes the complex correlation values $c_1$ to $c_K$ from the expected value computation unit 37.

The correlation matrix unit 39 obtains a correlation matrix in the vectorized complex correlation values $c_1$ to $c_K$ from the vector unit 38. The average frequency computation unit 40 obtains the average frequency of the calculated correlation matrix from the correlation matrix unit 39. The propagation time estimation unit 41 estimates the propagation time $\Delta$t based on the average frequency from the average frequency computation unit 40. The expected value computation unit 37, the vector unit 38, the correlation matrix unit 39, the average frequency computation unit 40, and the propagation time estimation unit 41 may form an example of a propagation time measurement unit.

The operation of the propagation time measurement device 3 will now be described with reference to FIGS. 1 to 4. In the present example, the terminal 2 does not process signals. Further, circuits do not cause delays, and delays occur only when propagating radio waves.

Referring to FIG. 1, each of the oscillators 4n (n is 1 to K) provides the real number acquisition unit 5 with complex signals $f_1(p)$ to $f_K(p)$ having different frequencies. The real number acquisition unit 5 acquires the real part of each of the complex signals $f_1(p)$ to $f_K(p)$ and provides the adder 6 with signals real($f_K(p)$) to real($f_K(p)$), which are formed from only real parts. The adder 6 adds the signals real($f_1(p)$) to real($f_K(p)$) to generate a combined signal real(F(p)) and provides the D/A converter with the combined signal real(F(p)). The combined signal real(F(p)) is expressed by equation (1).

$$F(p) = \sum_{k=1}^{K} f_k(p) \qquad (1)$$

The combined signal real(F(p)) is D/A-converted by the D/A converter 7 and provided as a combined signal real(F(t)) to the mixer 9. The combined signal real(F(t)) provided to the mixer 9 is multiplied by an oscillation signal from the local oscillator 8 and provided to the bandpass filter 10. The bandpass filter 10 allows for the passage of only a predetermined band in the combined signal real(F(t)). The combined signal real(F(t)) that passes through the bandpass filter 10 is transmitted through wireless communication from the transmission antenna 11 as a transmission signal real(F(t))cos(ωt).

Figure 2:
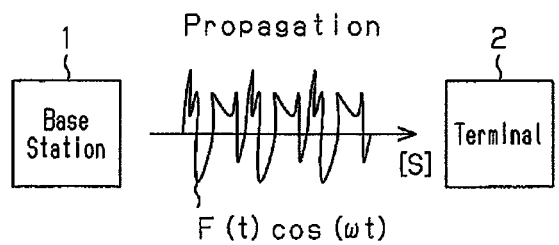
FIG. 2 is a diagram showing the transmission of a signal from a base station to a terminal.

Referring to FIG. 2, the transmission signal real(F(t))cos(ωt) transmitted from the transmission antenna 11 reaches the terminal 2 after the propagation time it. The transmission signal real(F(t))cos(ωt) is a repetitive signal having a repetitive predetermined waveform, which is generated by combining the complex signals $f_1(p)$ to $f_K(p)$. Further, the transmission signal real(F(t))cos(ωt) is a wideband signal.

Referring to FIG. 1, the terminal 2 receives, with the reception antenna 12, a reception signal real(F(t−Δt))cos(ωt) that is delayed by the propagation time Δt from the transmission signal real(F(t))cos(ωt) transmitted from the transmission antenna 11. The reception signal real(F(t−Δt))cos(ωt) passes through the bandpass filter 13 and is then provided to the mixer 15. The reception signal real(F(t−Δt))cos(ωt), which is provided to the mixer 15, is multiplied by an oscillation signal from the local oscillator 14 and provided to the lowpass filter 16. The lowpass filter 16 allows for passage of only signals having low frequencies. The reception signal real(F(t−Δt)), which passes through the lowpass filter 16, is A/D-converted by the A/D converter 17 and provided as a reception signal real(F(p−Δt)) to the signal processing unit 18.

The signal processing unit 18 reads the waveform of the reception signal real(F(p−Δt)) provided from the A/D converter 17. When the signal processing unit 18 correctly reads the reception signal real(F(p−Δt)), the signal processing unit 18 performs an operation for returning a reception signal real(F(p−Δt))cos(ωt) and provides the D/A converter 19 with a transmission signal real(F(p−Δt)).

The transmission signal real(F(p−Δt)) provided to the D/A converter 19 is D/A-converted to a transmission signal real(F(t−Δt)) and provided to the mixer 21. The transmission signal real(F(t−Δt)) provided to the mixer 21 is multiplied by an oscillation signal from the local oscillator 20 and provided to the bandpass filter 22. The bandpass filter 22 allows for passage of only a predetermined frequency band in the signal.

The signal that passes through the bandpass filter 22 is transmitted as a transmission signal real(F(t−Δt))cos(ωt) through wireless communication from the transmission antenna 23.

Figure 3:
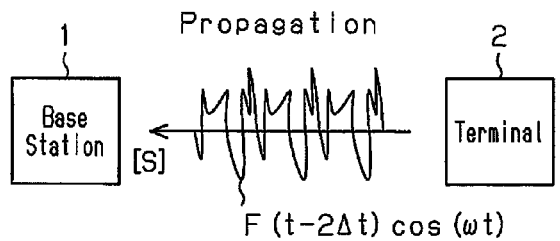
FIG. 3 is a diagram showing the signal returned from the terminal to the base station.

Referring to FIG. 3, the transmission signal real(F(t−Δt))cos(ωt) transmitted from the transmission antenna 23 reaches the base station 1 after the propagation time Δt. The transmission signal real(F(t−Δt))cos(ωt) transmitted from the terminal 2 has the same waveform as the transmission signal real(F(t))cos(ωt) transmitted from the base station 1 to the terminal 2. Further, the transmission signal real(F(t−Δt))cos(ωt) has a phase retarded by a predetermined time from the transmission signal real(F(t))cos(ωt).

Referring to FIG. 1, the base station 1 receives a reception signal real(F(t−2Δt))cos(ωt) that is transmitted from the terminal 2 and delayed by the propagation time Δt from the transmission signal real(F(t−Δt))cos(ωt). The reception signal real(F(t−2Δt))cos(ωt) is provided to each of the two bandpass filters 25 and 30. The bandpass filter 25 allows for passage of only a predetermined frequency band in the reception signal real(F(t−2Δt))cos(ωt). The reception signal real(F(t−2Δt))cos(ωt) provided to the mixer 27 is multiplied by an oscillation signal from the local oscillator 26 and provided to the lowpass filter 28. The lowpass filter 28 allows for passage of only a predetermined frequency band in the reception signal real(F(t−2Δt)). The reception signal real(F(t−2Δt)) that passes through the lowpass filter 28 is A/D-converted by the A/D converter 29 and provided as a reception signal real(F(p−2Δt)) to the complex signal generation unit 35.

The bandpass filter 30 allows for passage of only a predetermined frequency band in the reception signal real(F(t−2Δt))cos(ωt). The reception signal real(F(t−2Δt))cos(ωt) provided to the mixer 32 is multiplied by an oscillation signal from the local oscillator 26 having a phase retarded by 90° and provided to the lowpass filter 33. The signal that passes through the lowpass filter 33 is A/D converted by the A/D converter 34 and provided as a reception signal img(F(p−2Δt)).

When the reception signal real(F(p−2Δt)) and the reception signal img(F(p−2Δt)) from the two A/D converters 29 and 34 is provided to the complex signal generation unit 35, the complex signal generation unit 35 generates a complex signal (F(p−2Δt)) based on the reception signal real(F(t−2Δt)) and the reception signal img(F(p−2Δt)). The complex signal generation unit 35 provides the complex signal (F(p−2Δt)) to each correlation computation unit 36n (n is 1 to K).

The correlation computation unit 36-1 computes the correlation of a complex signal $f_1(p)$ from the first oscillator 4n and the complex signal (F(p−2Δt)) from the complex signal generation unit 35 to provide the expected value computation unit 37 with a correlation value $c_1(p)$ as the computation result. The correlation computation unit 36k computes the correlation of a complex signal $f_k(p)$ from the kth oscillator 4k and the complex signal (F(p−2Δt)) from the complex signal generation unit 35 to provide the expected value computation unit 37 with a correlation value $c_k(p)$ as the computation result. The correlation computation unit 36K computes the correlation of a complex signal $f_K(p)$ from the Kth oscillator and the complex signal (F(p−2Δt)) from the complex signal generation unit 35 to provide the expected value computation unit 37 with a correlation value $c_K(p)$ as the computation result.

The correlation value $c_K(p)$ is expressed by equation (2), where "*" is a symbol representing a complex conjugate, and "$f_k(t)$" represents a complex signal of each frequency.

$$c_k(p) = f_k^*(p) f_k(p-2\Delta t) \qquad (2)$$

The expected value computation unit 37 calculates complex correlation values $c_1$ to $c_K$ based on the complex correlation values $c_1(p)$ to $c_K(p)$ from the correlation computation units 36n (n is 1 to K). The expected value computation unit 37 provides the calculated complex correlation values $c_1$ to $c_K$ to the vector unit 38. The vector unit 38 vectorizes the complex correlation values $c_1$ to $c_K$ from the expected value computation unit 37. The correlation matrix unit 39 obtains a correlation matrix from the vectorized complex correlation values $c_1$ to $c_K$. The average frequency computation unit 40 obtains the average frequency of the calculated correlation matrix. The propagation time estimation unit 41 estimates the propagation time Δt based on the calculated average frequency. For example, a MUSIC algorithm may be performed to compute the propagation time Δt.

FIG. 4 illustrates an example in which the propagation time Δt is measured from, for example, a Fourier-transformed signal. In this measurement process, the propagation time Δt is measured by obtaining the correlation of the complex signal (F(p−2Δt)) and a combined signal F(p) of the complex signal $f_1(p)$ to $f_K(p)$. A Fourier transformation circuit (FFT) for the combined signal F(p) and a Fourier transformation circuit (FFT) for the complex signal (F(p−Δt)) are used in this process. Since the circuit configuration of FIG. 4 needs circuits for performing Fourier transformations, the device becomes complicated and the cost of the device increases.

In contrast, in the circuit configuration of the present example shown in FIG. 1, the correlation is computed for each of the complex signals $f_1(p)$ to $f_K(p)$. Thus, there is no need to perform Fourier transformation as illustrated in FIG. 4. The present example allows for the propagation time Δt to be estimated without performing Fourier transformation. This is advantageous in that the propagation time measurement device 3 is simplified and the cost of the device is reduced.

The present embodiment has the advantages described below.

(1) When computing the propagation time Δt, the correlation of a signal of the radio waves transmitted from the base station 1 and the signal returned from the terminal 2 need to be computed. In the present example, the correlation is computed for each of the complex signals $f_1(p)$ to $f_K(p)$. Thus, the propagation time Δt may be measured without performing a Fourier transformation. This simplifies the propagation time measurement device 3.

(2) To compute the propagation time Δt, a process for estimating the distance from the phase (e.g., MUSIC algorithm) is performed. Thus, the propagation time Δt may be accurately calculated.

(3) The propagation time measurement device 3 of the present example is applied to an electronic key system. Thus, for example, when unauthorized communication is performed with a relay, the verified ID may be invalidated. This improves the security of the electronic key system.

It should be apparent to those skilled in the art that the present invention may be embodied in many other specific forms without departing from the spirit or scope of the invention. Particularly, it should be understood that the present invention may be embodied in the following forms.

The circuit configuration of the propagation time measurement device 3, that is, the circuit configuration of the base station 1 and the terminal 2 is not limited to the configuration described in the above embodiment and may be modified when necessary.

The MUSIC algorithm does not have to be used when estimating the propagation time Δt from the phase of the radio wave. For example, the ESPRIT algorithm may be used instead.

As long as the time for radio waves to go back and forth may be measured, the propagation time Δt may be computed through any process.

The propagation time measurement device 3 may be used to measure the propagation time Δt.

The propagation time measurement device 3 is not limited to an electronic key system and may be applied to any of a variety of systems and devices.

In the signal processing unit 18 of the terminal 2, signal processing known in the art may be performed with the base station 1. This prevents deception of the propagation time that may occur when, for example, a relay directly transmits a transmission time measurement signal to the base station 1.

The circuit configuration of the first demodulation unit and the second demodulation unit may be changed from that described in the above embodiment.

A continuous wave does not have to be used as a complex signal.

As long as the frequency bands of the complex signals $f_K(p)$ do not overlap one another, the continuous wave is not limited to a non-modulated wave and may be replaced by a signal that undergoes any type of modulation.

The continuous wave does not have to be a wave that is continuous throughout the period from when a transmission starts to when the transmission ends. The continuous wave may be interrupted.

The present examples and embodiments are to be considered as illustrative and not restrictive, and the invention is not to be limited to the details given herein, but may be modified within the scope and equivalence of the appended claims.

The invention claimed is:

1. A propagation time measurement device that measures a propagation time of a transmission signal from when the transmission signal is transmitted, through wireless communication, from a base station to a terminal to when the transmission signal is returned to the base station from the terminal, wherein a plurality of continuous waves having different frequencies are combined to generate the transmission signal, the propagation time measurement device comprising:
   a correlation computation unit that generates a plurality of correlation values by performing a correlation computation on each of the continuous waves and a reception signal that is returned from the terminal and received by the base station; and
   a propagation time measurement unit that measures the propagation time from a phase of the correlation value generated for each continuous wave in the correlation computation.

2. The propagation time measurement device according to claim 1, wherein each of the continuous waves is a complex signal including a real part and an imaginary part.

3. The propagation time measurement device according to claim 2, further comprising:
   a real number acquisition portion that generates the transmission signal by acquiring a plurality of real parts from the continuous waves and combining the real parts of the continuous waves;
   a first demodulation unit that generates a real part of the reception signal by demodulating the reception signal at a predetermined phase;

a second demodulation unit that generates an imaginary part of the reception signal by demodulating the reception signal at a phase retarded by 90° from the predetermined phase; and a complex signal generation unit that generates a complex signal based on the real part, generated by the first demodulation unit, and the imaginary part, generated by the second demodulation unit, wherein the correlation computation unit is one of a plurality of correlation computation units, and each of the correlation computation units generates the correlation value by performing a correlation computation on a complex signal of a corresponding continuous wave and the complex signal generated by the complex signal generation unit.

4. The propagation time measurement device according to claim 1, wherein the correlation computation unit performs the correlation computation using $$c_k(p) = f_k^*(p) f_k(p - 2\Delta t)$$

where $c_k(p)$ represents a correlation value, $f_k(p)$ represents a signal of each frequency, $\Delta t$ represents the propagation time, and "*" is a symbol representing a conjugate transpose.

5. The propagation time measurement device according to claim 1, wherein the transmission signal transmitted from the base station includes a fixed frequency band.

6. The propagation time measurement device according to claim 1, wherein the propagation time measurement unit estimates the propagation time based on an amount of change in a phase of the reception signal from a phase of the transmission signal.

7. The propagation time measurement device according to claim 1, further comprising:

an expected value computation unit that generates a plurality of complex correlation values by performing an expected value computation on the correlation values from the correlation computation unit;

a vector unit that vectorizes the complex correlation values from the expected value computation unit;

a correlation matrix unit that acquires a correlation matrix of the vectorized complex correlation values from the vector unit; and an average frequency computation unit that acquires an average frequency of the correlation matrix from the correlation matrix unit, wherein the propagation time measurement unit estimates the propagation time based on the average frequency from the average frequency computation unit.

8. An electronic key system in which a transmission signal is transmitted, through wireless communication, from a vehicle to an electronic key and returned to the vehicle from the electronic key, wherein a plurality of continuous waves having different frequencies are combined to generate the transmission signal, the electronic key system comprising a propagation time measurement device that measures a propagation time of the transmission signal from when the vehicle transmits the transmission signal to the electronic key to when the transmission signal returns to the vehicle from the electronic key, wherein the propagation time measurement device includes a correlation computation unit that generates a plurality of correlation values by performing a correlation computation on each of the continuous waves and a reception signal that is returned from the electronic key and received by the vehicle, and a propagation time measurement unit that measures the propagation time from a phase of the correlation value generated for each continuous wave in the correlation computation.

* * * * *